(12) United States Patent
Steveley et al.

(10) Patent No.: US 9,115,816 B2
(45) Date of Patent: Aug. 25, 2015

(54) CHECK VALVE WITH MODULATION AND/OR ANTI-OSCILLATION FEATURE

(75) Inventors: Kip R. Steveley, Rochester Hills, MI (US); Steven Zillig, Clarence, NY (US); Arthur Murray, Medina, NY (US); James Messecar, Wyoming, NY (US); Michael A. Lenartowicz, Jamesville, NY (US); James Caroll, Novi, MI (US)

(73) Assignee: JIFFY-TITE COMPANY, INC., Lancaster, NY (US)

( * ) Notice: Subject to any disclaimer, the term of this patent is extended or adjusted under 35 U.S.C. 154(b) by 1028 days.

(21) Appl. No.: 12/716,456

(22) Filed: Mar. 3, 2010

(65) Prior Publication Data

US 2010/0224258 A1 Sep. 9, 2010

Related U.S. Application Data

(60) Provisional application No. 61/157,277, filed on Mar. 4, 2009.

(51) Int. Cl.
*F16K 15/04* (2006.01)
*F16K 47/02* (2006.01)

(52) U.S. Cl.
CPC .............. *F16K 15/044* (2013.01); *F16K 47/023* (2013.01)

(58) Field of Classification Search
CPC ............................... F16K 15/044; F16K 47/023
USPC .............. 137/514.5, 539.5, 540, 543.13, 901, 137/543.17, 543.19, 539; 251/322, 323, 251/333, 337
See application file for complete search history.

(56) References Cited

U.S. PATENT DOCUMENTS

| | | | | |
|---|---|---|---|---|
| 2,714,392 | A | * | 8/1955 | Mercier ...................... 137/514.7 |
| 2,858,838 | A | * | 11/1958 | Scaramucci ............. 137/516.29 |
| 2,931,385 | A | * | 4/1960 | Carlisle et al. ........... 137/516.29 |
| 3,440,833 | A | | 4/1969 | Fernandes |
| 3,931,831 | A | | 10/1975 | Talak |
| 4,474,208 | A | * | 10/1984 | Looney .................... 137/516.29 |
| 4,640,534 | A | | 2/1987 | Hoskins et al. |
| 4,895,499 | A | * | 1/1990 | Gargas ......................... 417/506 |
| 5,347,825 | A | | 9/1994 | Krist |

(Continued)

FOREIGN PATENT DOCUMENTS

DE 3901032 C1 2/1990
EP 0135140 A1 3/1985

(Continued)

OTHER PUBLICATIONS

Communication Pursuant to Rule 69 EPC dated Sep. 13, 2010 for European Application No. 10155019.2.

(Continued)

*Primary Examiner* — Kevin Lee
*Assistant Examiner* — P. Macdade Nichols
(74) *Attorney, Agent, or Firm* — Young Basile Hanlon & MacFarlane P.C.

(57) ABSTRACT

A check valve includes a modulation and/or anti-oscillation feature which, in one aspect, modulates the position of the check valve ball relative to the valve seat to maintain the ball in a continuous flow position allowing pressurized fluid flow past the ball while preventing contact between the ball and the valve seat. In another aspect, an increased mass is selectively coupled to or forms a part of the movable valve member to dampen oscillations of the movable valve member in an open fluid flow position without contact with the valve seat.

12 Claims, 16 Drawing Sheets

(56) References Cited

U.S. PATENT DOCUMENTS

| | | |
|---|---|---|
| 5,586,449 A | 12/1996 | Krist |
| 5,992,515 A | 11/1999 | Spiegel |
| 6,012,550 A | 1/2000 | Lee |
| 6,253,837 B1 | 7/2001 | Seller et al. |
| 6,499,666 B1 | 12/2002 | Brown |
| 6,527,046 B1 | 3/2003 | White |
| 6,719,208 B2 | 4/2004 | Brown |
| 6,740,000 B2 | 5/2004 | Wakayama |
| 6,772,958 B1 | 8/2004 | Lamb et al. |
| 6,799,631 B2 | 10/2004 | Acre |
| 6,830,527 B2 | 12/2004 | Wakayama |
| 6,935,569 B2 | 8/2005 | Brown et al. |
| 6,962,295 B2 | 11/2005 | Ieda |
| 6,988,364 B1 | 1/2006 | Lamb et al. |
| 7,299,994 B2 | 11/2007 | Brown et al. |
| 2001/0003312 A1 | 6/2001 | Spiegel |
| 2003/0019620 A1 | 1/2003 | Pineo et al. |
| 2003/0136855 A1 | 7/2003 | Brown |
| 2004/0134650 A1 | 7/2004 | Acre |
| 2004/0232249 A1 | 11/2004 | Brown et al. |
| 2005/0145706 A1 | 7/2005 | Cardinali Ieda |
| 2006/0016900 A1 | 1/2006 | Brown et al. |
| 2006/0060347 A1 | 3/2006 | Moser et al. |
| 2006/0076129 A1 | 4/2006 | Eliades et al. |
| 2006/0108435 A1 | 5/2006 | Kazdras et al. |
| 2006/0201455 A1 | 9/2006 | Chanfreau et al. |
| 2007/0029398 A1 | 2/2007 | Conlin |
| 2007/0090200 A1 | 4/2007 | Lamb et al. |
| 2007/0137709 A1 | 6/2007 | Kempf et al. |
| 2007/0158059 A1 | 7/2007 | Pineo et al. |
| 2007/0164123 A1 | 7/2007 | Willers et al. |
| 2008/0029246 A1 | 2/2008 | Fratantonio et al. |
| 2008/0093066 A1 | 4/2008 | Bird et al. |
| 2009/0025922 A1 | 1/2009 | Strexelcyk et al. |
| 2009/0107137 A1 | 4/2009 | Lionello et al. |

FOREIGN PATENT DOCUMENTS

| | | |
|---|---|---|
| EP | 1681500 A1 | 7/2006 |
| GB | 870631 A | 6/1961 |
| JP | 12045773 A | 2/2000 |
| WO | WO2006069072 A2 | 6/2006 |
| WO | WO2009012311 A2 | 1/2009 |

OTHER PUBLICATIONS

International Search Report issued Jan. 6, 2009 for PCT/US2008/070179.

Written Opinion of the International Search Authority issued Jan. 5, 2009 for PCT/US2008/070179.

European Search Report Application No. EP 10 15 5019 completed Jul. 1, 2010.

* cited by examiner

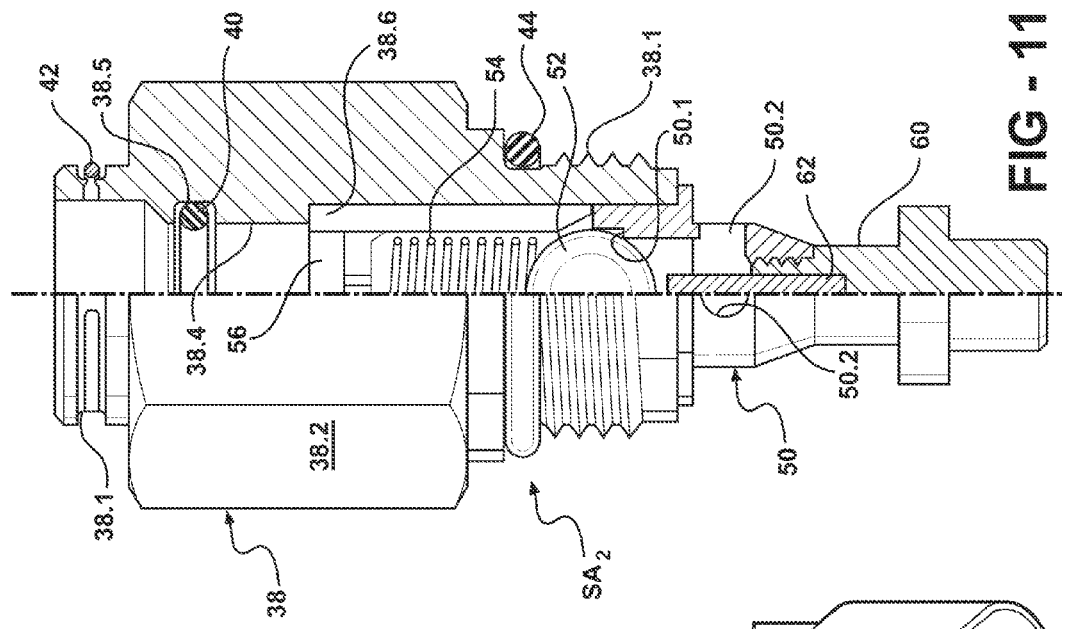
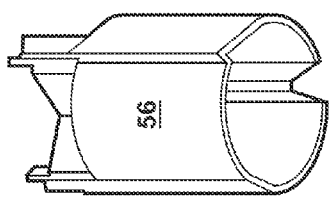
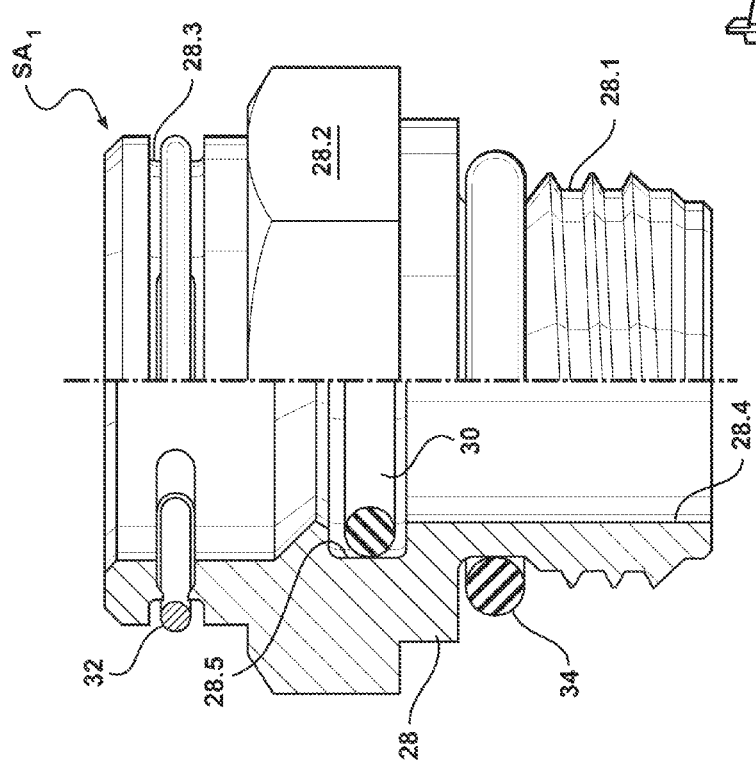
FIG - 11
FIG - 12
FIG - 10

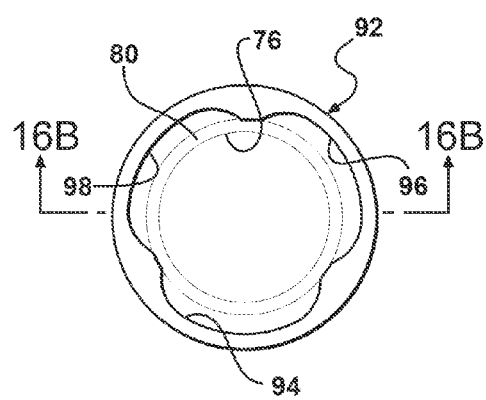
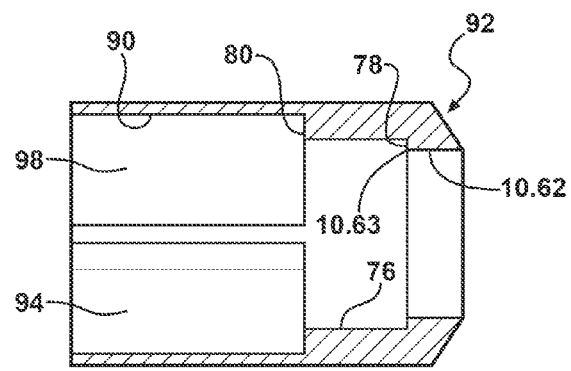
FIG - 16A     FIG - 16B
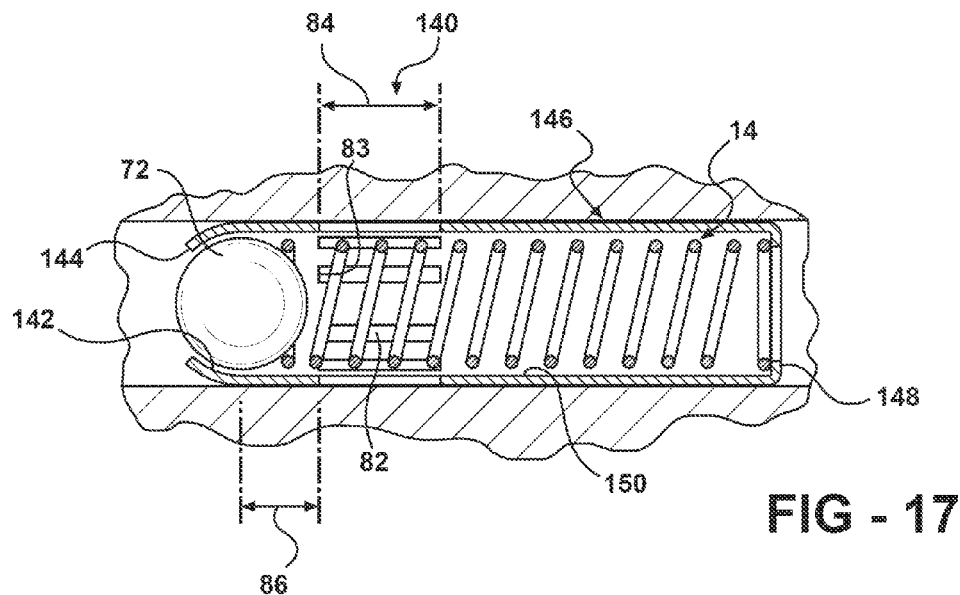
FIG - 17

CHECK VALVE WITH MODULATION AND/OR ANTI-OSCILLATION FEATURE

CROSS REFERENCE TO CO-PENDING APPLICATION

This application claims the priority benefit to the filing date of co-pending U.S. Provisional Patent Application Ser. No. 61/157277 filed on Mar. 4, 2009, for Check Valve With Modulation and/or Anti Oscillation Feature, the entire contents of which are incorporated herein in its entirety.

BACKGROUND

The present invention relates to check valves and also to check valves used in cooler bypass assemblies which only permit fluid flow to a cooler when the temperature of the fluid is above a certain temperature.

Check valves are mounted in bores in a housing or other element and have a movable member, such as a ball, which is movable into and out of engaged sealing engagement with a valve seat formed in the bore to open or close off fluid flow through the bore while allowing the fluid, when flowing, to flow in only one direction through the bore. A spring exerts a biasing force on the movable member or ball to normally bias the ball into engagement with the valve seat to close off fluid flow through the bore.

When the fluid pressure in the bore increases to a magnitude greater than the spring force, the fluid pressure overcomes the spring force and moves the ball away from the valve seat. This opens the bore to through flow of fluid from the bore inlet to the bore outlet. When the fluid pressure decreases below the spring force, the spring moves the ball back into engagement with the valve seat to close off fluid flow through the bore.

However, oscillation of the movable member or ball can occur when the ball rapidly reciprocates into and out of engagement with the valve seat creating objectionable noise and valve chatter. This occurs just after the ball disengages from the valve seat as fluid flow past around the ball creates a momentary pressure equalization on both sides of the ball. This momentary pressure equalization relieves the pressure acting to force the ball against the spring and allows the spring to move the ball back toward the valve seat. The reciprocating movement of the ball into and out of engagement with the valve seat causes in the objectionable valve chatter.

It would be desirable to provide a check valve which minimizes valve chatter resulting from oscillation of the movable valve member into and out of engagement with the valve seat; while still enabling proper operation of the check valve.

SUMMARY

A check valve is disclosed that is usable by itself in fluid applications and fluid components to define one-way fluid flow through a bore or through a transverse or bypass passageway in a bypass cooler assembly. The valve includes a valve seat, a movable valve body and a spring which engages the body to normally bias the body into sealing engagement with the valve seat. An oscillation dampening construction acts to dampen oscillation of a movable member when the movable member is in a fluid flow allowing position relative to the valve seat.

In one aspect, the oscillation dampening construction includes a bore having substantially the same diameter as an outer diameter of the movable valve body. The bore extends from the valve seat for a first distance and defines a first no-leak zone for movement of the movable body away from the valve seat without substantial fluid flow through the first distance of the bore. A second modulation zone extends from the end of the first distance for a second distance defining a modulated flow zone for the movable body where the movable body is biased away from contact with the valve seat by a volume of fluid flowing through the first distance into the second distance past the movable valve body.

In another aspect, at least a portion of the second modulation zone has a larger diameter than a diameter of the first no-leak zone.

In yet another aspect, the second modulation zone includes at least one fluid flow passageway having a larger diameter than a fluid flow bore extending through the second modulation zone.

In another aspect, the second modulation zone has at least one flow passage of increasing diameter through the second distance.

In another aspect, the second modulation zone is defined by a flow path extending from the passageway to an outlet.

In another aspect, the first zone has a substantially constant diameter through at least the first distance.

In another aspect, an insert is adapted to be mounted in the passage way. The insert carries the movable body, the spring, and the oscillation dampening construction. A valve seat may be integrally carried in the insert.

In another aspect, the oscillation dampening construction is carried in a valve housing which also carries the valve seat, the removable body, the biasing member and the fluid flow passage.

The check valve, in another aspect is, provided with an increased mass feature which dampens oscillations of the movable member or ball of the check valve in all directions in the fluid flow bore. A piston rod is mounted in a bore in a spring retainer carried in the fluid flow bore of a housing. A spring is seated between the spring retainer and a piston mounted on the piston rod to bias the piston into contact with the movable valve member to normally bias the movable valve member into sealed engagement with the valve seat to block fluid flow through the bore. When the fluid flow pressure exceeds the spring force, the fluid urges the movable valve member and piston away from the valve seat allowing fluid to flow over the movable valve member and into the fluid bore. In another aspect, the movable valve member and the piston are integrated with the piston rod into a unitary structure.

The increased mass provided by the engagement of the piston and piston rod with the movable valve member dampens oscillations of the movable valve member to maintain the movable valve member in the open fluid flow position without contact with the valve seat.

It would be desirable to provide a cooler bypass assembly which can be connected to machinery which has fluid which may need to be cooled, and to the cooler lines which uses the described check valve.

BRIEF DESCRIPTION OF THE DRAWING

The various features, advantages and other uses of the present invention will become more apparent by referring to the following detailed description and drawing in which:

FIG. 10 is a view of a coupling subassembly indicated at $SA_1$ in FIG.;

FIG. 11 is a view of a coupling subassembly indicated at $SA_2$ in FIG. 9;

FIG. 12 is an isometric view of the spring and ball guide shown in FIG. 9;

FIG. 16A is an end view of the valve shown in FIG. 14;

FIG. 16B is a longitudinal cross sectional view generally taken along line 16B-16B in FIG. 16A;

FIG. 17 is a longitudinal cross sectional view showing another aspect of a check valve;

DETAILED DESCRIPTION

Figure 1:
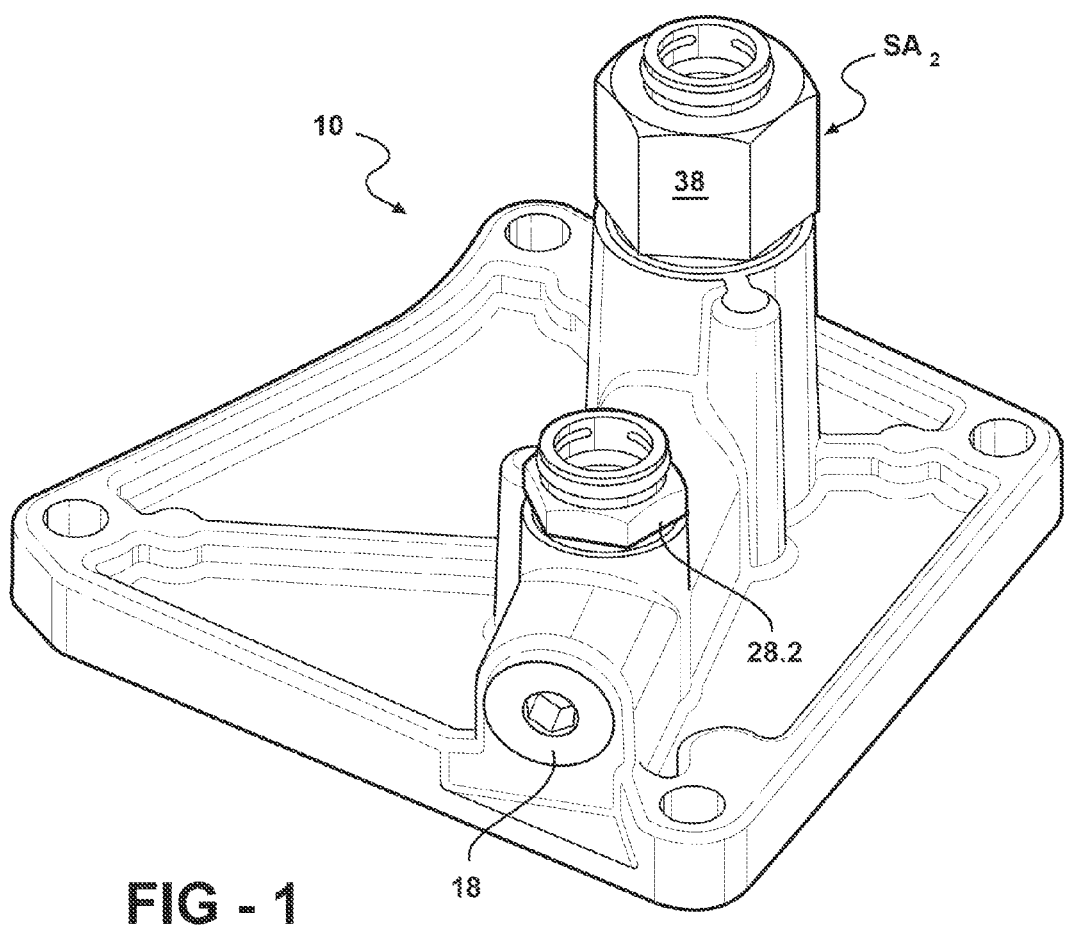
FIG. 1 is an isometric view of a cooler bypass apparatus.
Figure 2:
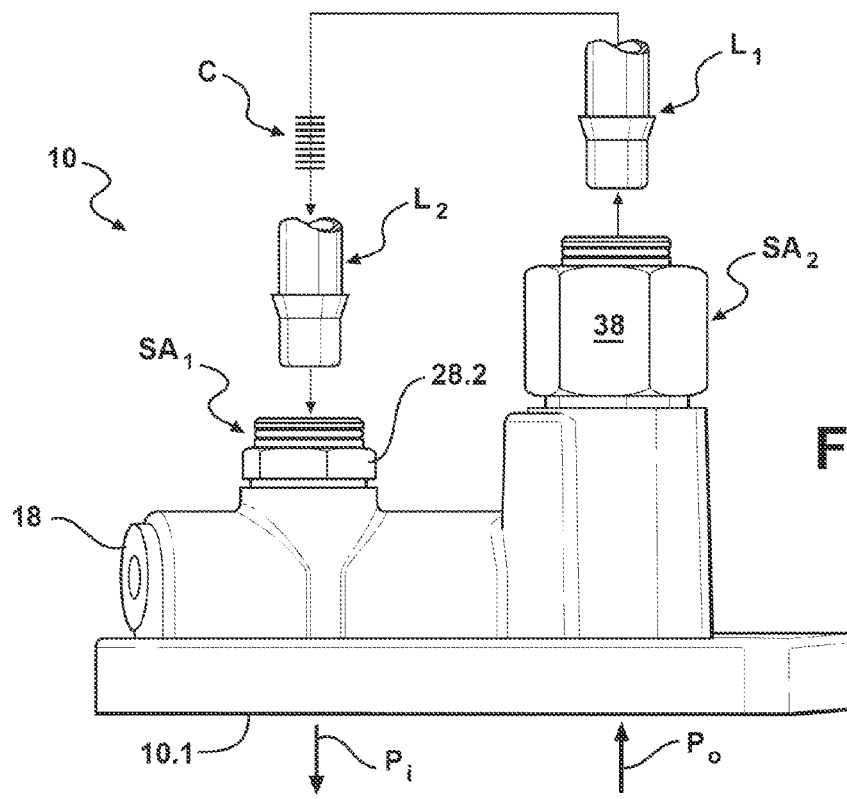
FIG. 2 is a side view of the apparatus this view further showing a cooler, and cooler lines.
Figure 3:
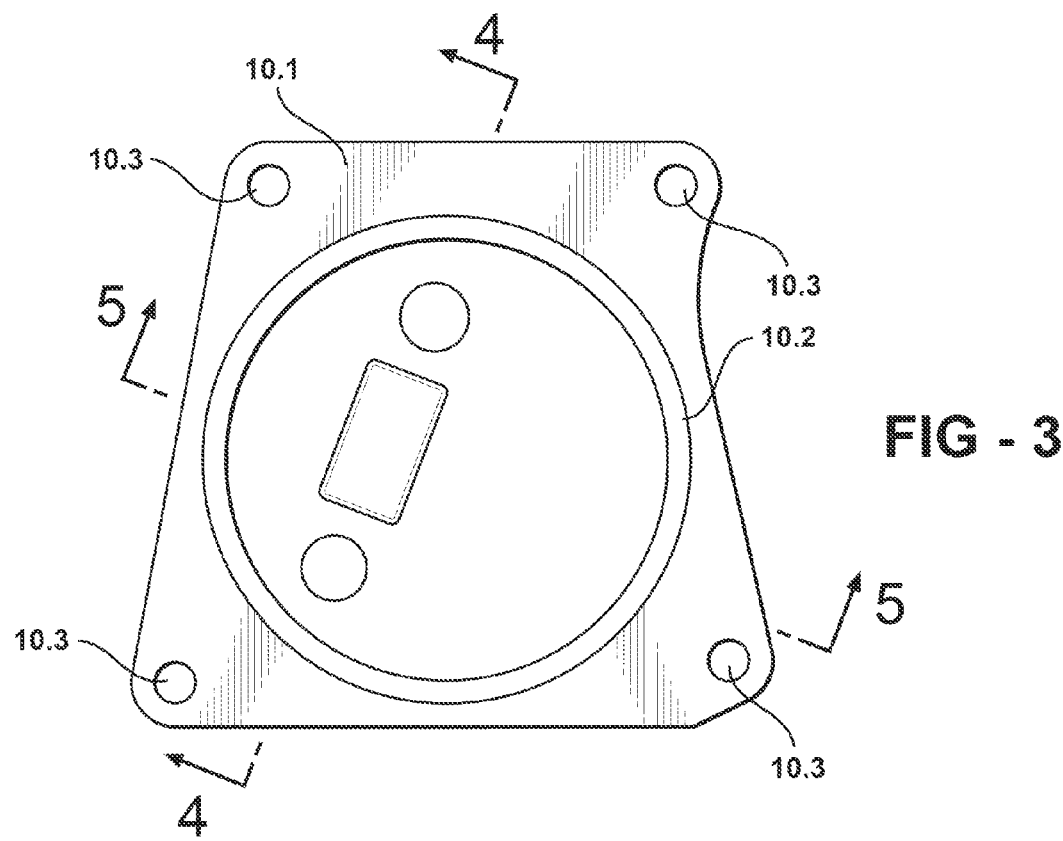
FIG. 3 is a bottom view of the apparatus.
Figure 4:
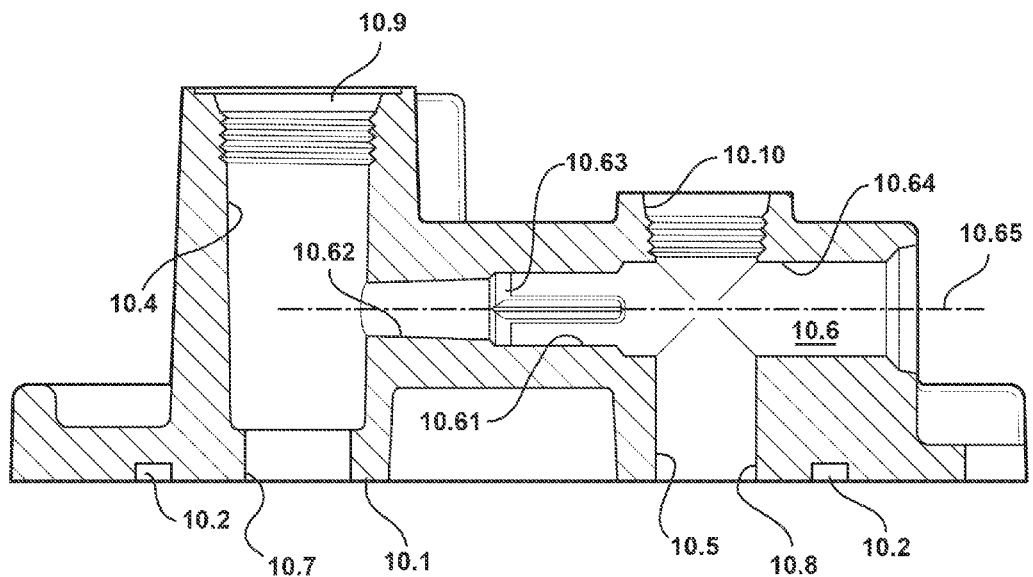
FIG. 4 is a sectional view through the casting to which various parts are assembled to form the assembly, this view being taken generally along the line 4-4 in FIG. 5.
Figure 5:
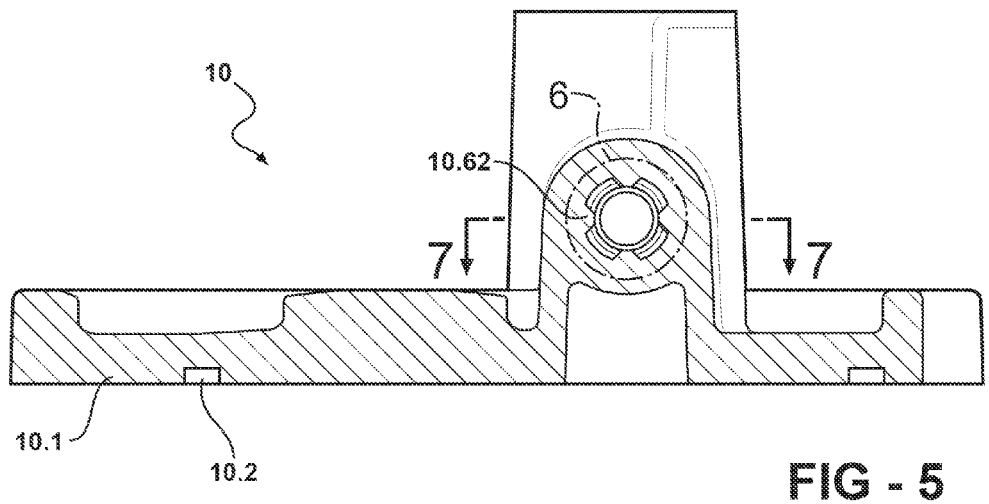
FIG. 5 is another sectional view through the casting, this view being taken generally along the line 5-5 in FIG. 3.
Figure 6:
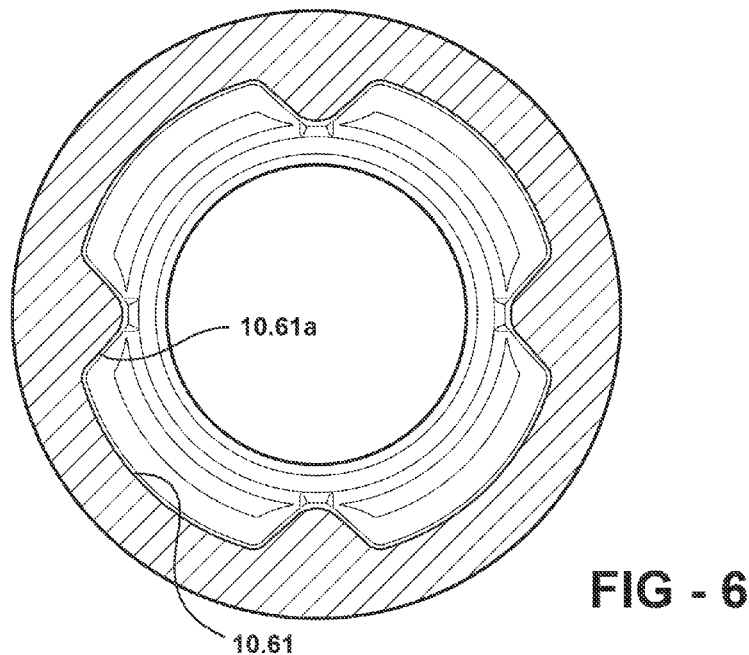
FIG. 6 is an enlarged detail of a portion of FIG. 5.
Figure 7:
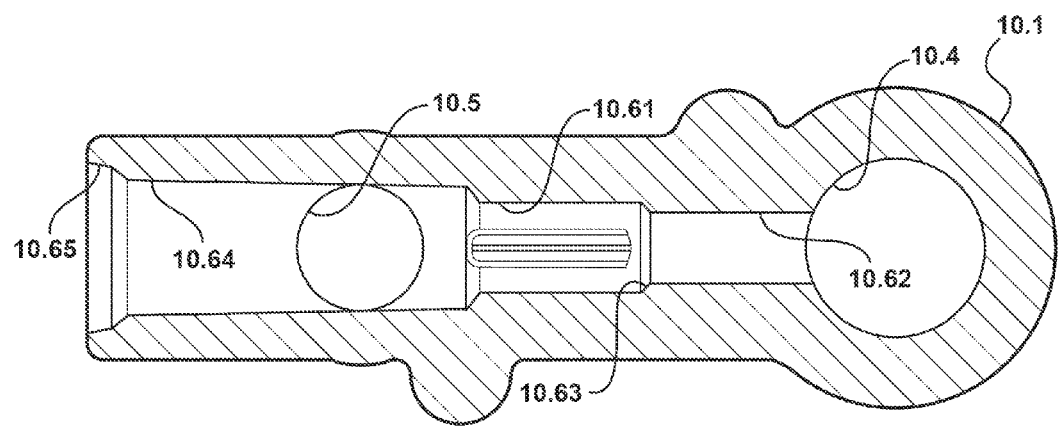
FIG. 7 is a section taken generally along the line 7-7 in FIG. 5.

With reference to FIGS. 1-9, a cooler bypass assembly is depicted, by example, and includes an aluminum casting or bypass mounting plate or housing indicated generally at 10 to which first and second fluid line coupling subassemblies $SA_1$ and $SA_2$ are secured, along with various other components. The casting 10 is provided with a relatively flat bottom surface 10.1 which may be secured to a corresponding flat surface on the machinery which carries a fluid that needs to be cooled. In order to insure a non-leak connection the casting 10 is provided with a groove 10.2 (FIG. 3) on its bottom surface which receives an O-ring 20. In order to secure the casting to the machinery, a plurality of bolt holes 10.3 are provided through which bolts (not shown) may pass to secure the casting 10 to the machinery (not illustrated).

It will be understood, however, that the casting or housing 10 can be a stand alone unit which is coupled to the fluid carrying machinery by pipes or conduits or by quick connectors to pipes and/or fastened to an available surface near the fluid carrying machinery. The casting 10 is provided with two generally vertical passageways 10.4 and 10.5 and a transverse connecting passageway 10.6. As can best be seen from FIG. 4, the first vertical passageway 10.4 has an inlet port 10.7 which is adapted to be aligned with an outlet port in the machinery, and has a threaded outlet port 10.9 which is adapted to receive the first fluid line coupling subassembly $SA_1$. The second passageway has an outlet port 10.8 which is also adapted to be aligned with a corresponding port in the machinery to which the casting is secured. The second passageway also has a threaded inlet port 10.10 which is adapted to receive the second fluid line coupling subassembly $SA_2$. Each of the first and second passageways is adapted to be connected with a cooler through the fluid line coupling subassemblies $SA_1$ and $SA_2$ to cooler lines, which have special end portions $L_1$ and $L_2$, respectively. Each of the end portions is generally tubular, but is provided with an outwardly extending abutment or ferrule. The quick connect couplers will be described below. As can best be seen from FIGS. 6 and 7 the transverse passageway has first and second portions 10.61 and 10.62 of differing diameters to one side of the vertical passageway 10.5, passageway 10.61 being of a larger diameter than passageway 10.62, there being a seat 10.63 between the passageways 10.61 and 10.62 to receive a ball check valve. As can best be seen from FIG. 6, the larger diameter portion 10.61 is provided with inwardly extending ribs 10.61a which act as ball guides, but which do not restrict fluid flow. The passageway also has a further large diameter portion 10.64 which extends from the vertical passageway 10.5 to the exterior of the aluminum casting, the end portion being threaded as at 10.65 in FIG. 4.

Mounted within the housing are various subassemblies. The first of these subassemblies includes a check valve in the form of a movable element or body 12, such as a ball, a cylindrical piston or other shaped element, a spring 14 to normally force the ball 12 into the valve seat 10.63, and ballcheck retainer 16 best illustrated in FIGS. 8 and 9. The movable body 12 will be described as a ball, for example only The retainer 16 is provided with a relatively large diameter end portion 16.1, a relatively small diameter end portion 16.2 which is adapted to be disposed within the spring 14, flutes 16.3 which are adapted to bear against one end of the compression spring 14, and a small diameter intermediate portion disposed between the flutes 16.3 and the large diameter portion 16.1. It can be seen from an inspection of FIG. 8 that the large diameter portion 16.1 is adapted to be disposed within the larger diameter portion 10.64 of the passageway 10.6, and the small diameter portion 16.2 is adapted to lie across the passageway 10.5 so that flow through passageway 10.5 will not be impeded.

Figure 8:
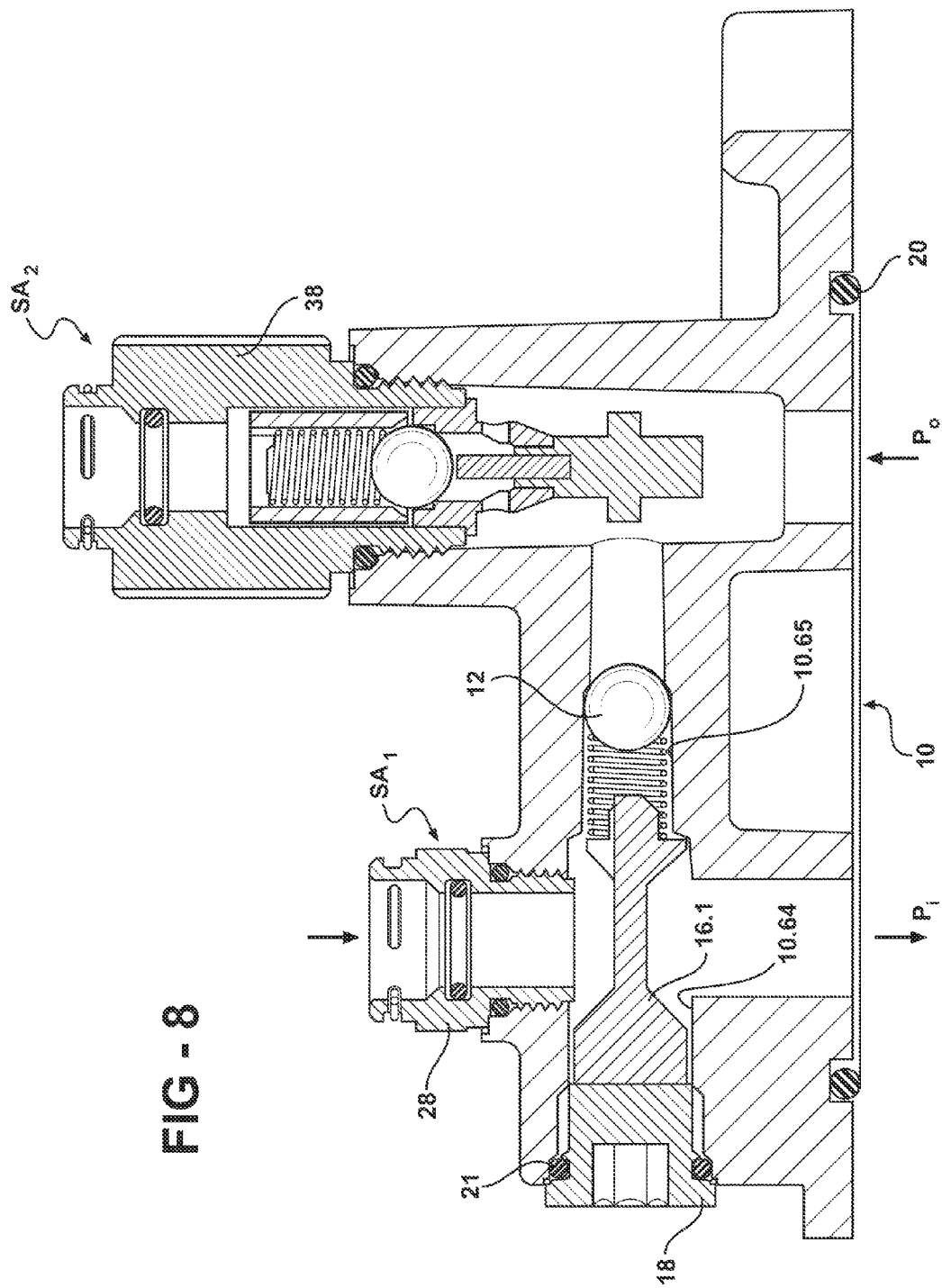
FIG. 8 is a sectional view of the assembly shown in FIG. 1.
Figure 9:
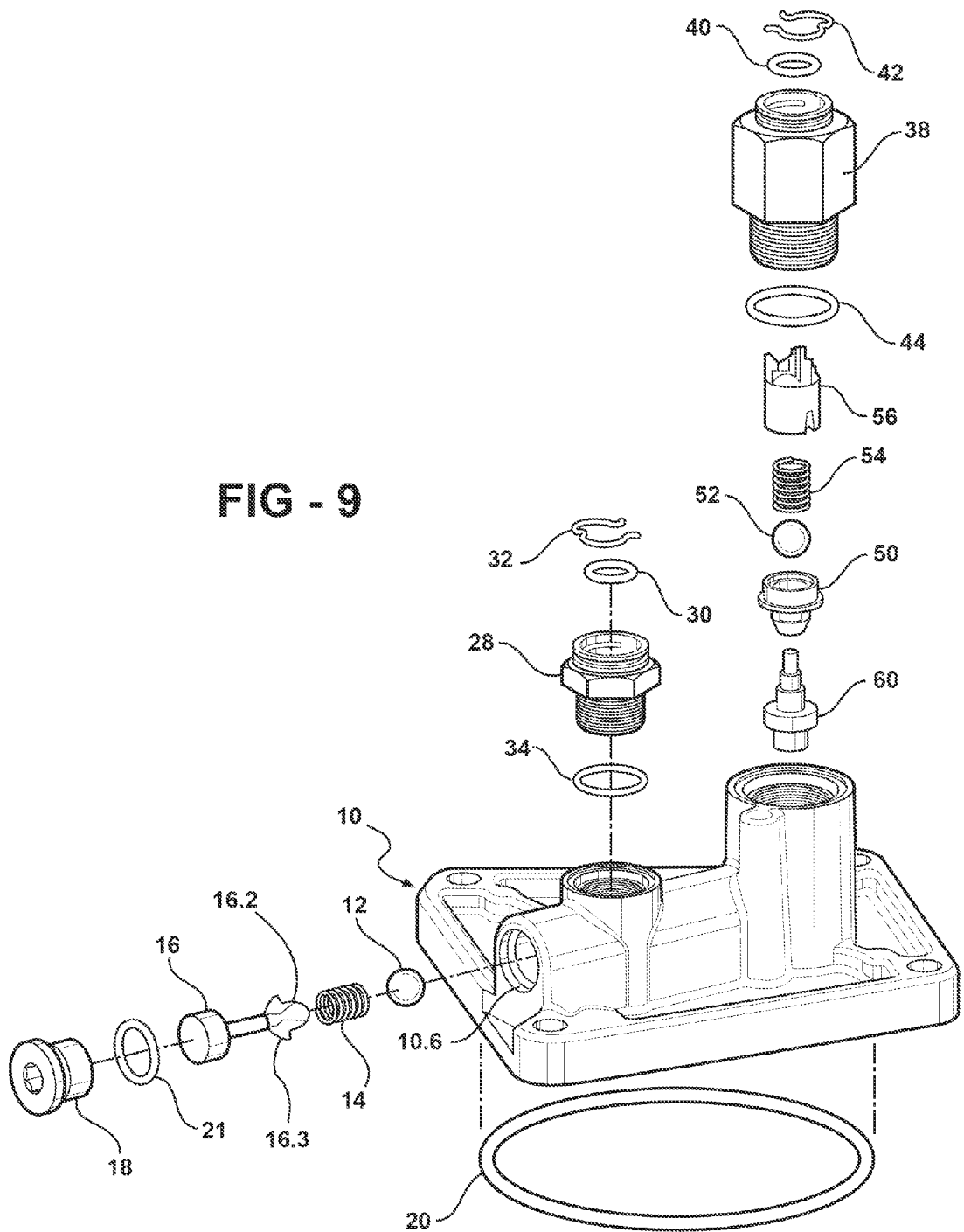
FIG. 9 is an exploded view of the assembly.

Associated with this check valve subassembly 12, 14, 16 is a plug subassembly which includes plug 18 and O-ring 21. When the parts are assembled, and then there is no fluid flow within the housing, the plug 18 and associated O-ring 21 will be screwed into the normally open end 10.65 of the passageway 10.6, the plug 18 and O-ring 21 closing the end of the passageway so no fluid can pass out of the housing though the passageway 10.6. As seen in FIG. 8, the right hand end of the plug 18 will bear against the left hand end 16.1 of the retainer 16. The left hand end of the spring 14 will pass over the small diameter right-hand end 16.2 of the retainer 16, and will be held in compression, with the right hand end of the spring forcing the ball 12 towards and into contact with the seat 10.63 when there is no fluid pressure within the assembly. At the same time the left hand end of the spring will bear against the flutes 16.3 of the retainer. When the ball is against the seat 10.63, there is no flow through the passageway 10.6. However, when the pressure within passageway 10.4 to the right of the ball 12, as viewed in FIG. 8, is greater than the spring force, the ball will be forced off its seat permitting flow from the first vertical passageway 10.4, through the smaller diameter passageway 10.62, past the seat, then into and through the larger diameter passageway 10.61, and finally into the other vertical passageway 10.5. The flutes 16.3 of the ballcheck retainer 16 will permit unimpeded flow of fluid past the flutes.

The first fluid line coupling subassembly $SA_1$ is best illustrated in FIG. 10. This coupling assembly is similar to the female coupling assembly shown in U.S. Pat. No. 4,640,534, the subject matter of which is incorporated herein by reference thereto. Thus, the subassembly $SA_1$ has a principal body 28 having a fluid passageway 24.4 extending through it, a first O-ring 30, a spring clip 32, and a second O-ring 34. The body 28 has a threaded end portion 28.1 which is screwed into the threaded port 10.10. The body 28 also has an enlarged portion 28.2, hexagonal in cross section, which may be engaged by a wrench or the like for the purpose of screwing it into the port 10.10. The O-ring 34 is received in a groove (no number) between the threaded portion 28.1 and the hex portion 28.2 to insure a leak-tight seal when assembled. The body is further provided with groove 28.3 adjacent the end spaced away from the threaded end, the groove having suitable apertures so that it may receive the spring clip 32. The passageway 28.4 of the body of the female coupler is provided with a groove 28.5 which receives O-ring 30. When the cooler line end portion is fully inserted into the fluid line coupling assembly, the spring clip will engage on side of the abutment on the cooler line end portion to prevent it from being withdrawn, and the O-ring 30 will hear against the tubular portion to prevent leakage.

The second fluid line coupler assembly $SA_2$ is best shown in FIGS. 8 and 11. This assembly includes a coupler subassembly similar to the coupler assembly $SA_1$, a ball check valve subassembly, and a thermal actuator. The coupler subassembly includes a principal body 38 having a fluid passageway extending through it, a first O-ring 40, a spring clip 42, and a second O-ring 44. The body has a threaded end portion 38.1 which is screwed into the threaded port 10.9. The body 38 also has an enlarged portion 38.2, hexagonal in cross section which may be engaged by a wrench or the like for the purpose of screwing it into the port 10.10. The O-ring 44 is received in a groove between the threaded portion 38.1 and the hex portion 38.2 to insure a leak-tight seal when assembled. The body 38 is further provided with a groove 38.3 adjacent the end spaced away from the threaded end, the groove 38.3 having suitable apertures so that it may receive the spring clip 42. The passageway 38.4 of the body 38 of the coupler is provided with a groove 38.5 which receives O-ring 40. When the cooler line end portion $L_1$ is fully inserted into the fluid line coupling assembly, the spring clip 42 will engage on side of the abutment on the cooler line end portion to prevent it from being withdrawn, and the O-ring 40 will bear against the tubular portion below the abutment to prevent leakage.

A cross drilled ball seat member 50 is secured to end of the passageway 38.4 remote from the spring clip 42 by force fit or any other suitable manner. The ball seat member 50 has a ball seat 50.1 which a ball 52 may rest against. The ball 52 is normally forced into contact with the seat by a compression spring 54, the spring 54 being retained within ballcheck sleeve 56. The sleeve 56 bears against a shoulder 38.6 in the body 38 to hold the spring 54 and ball 52 in their proper operating condition. A thermal actuator 60 is secured to the end of the ball seat member 50 at a location spaced away from the seat 50.1 by threads, a press fit, etc.

The thermal actuator has a piston 62 which may contact the ball 52. In operation, the piston of the thermal actuator, which may be of the type sold by Caltherm of Columbus, Ind., for example, will raise the ball 52 away from the seat when the fluid temperature is above a certain point, permitting flow through the cross drilled apertures 50.2, past the ball 52, and then into line $L_1$.

The design described above allows for any type of attachment to a mating port. The mating plate can be designed to any customer specification, and the assembly can also be incorporated into a stand-alone housing that could be connected in-line with the transmission cooling lines utilizing quick-connects.

In order to understand the operation of the cooler bypass assembly, it will be assumed that it is mounted on an automatic transmission. It is well known in the art that the fluid within a transmission has a desired operating temperature, typically in the range of 175-225° F. depending upon make and model. When the automatic transmission fluid (ATF) is below this temperature, the transmission will have operating inefficiencies due to its higher viscosity, which causes the vehicle to consume more fuel. At temperatures above the desired operating temperature, the life of the ATF will begin to plummet. In order to prevent loss of life of the ATF, the transmission fluid is passed through a cooler, which may be in the automotive radiator. Alternatively, if the vehicle is equipped with a trailer towing package, the transmission fluid is passed through an external cooler. At normal ambient temperature ranges, it typically takes only about 10 minutes for the ATF to reach its desired operating temperature, However, in extreme conditions, for example a vehicle having an external cooler which is not towing a trailer, and when the temperature is quite cold, for example 10° F., the ATF fluid may never attain the desired operating temperature range if passed through a cooler. In any event, passing the ATF through a cooler decreases the efficiency of a vehicle until the desired operating temperature has been achieved.

In operation, the cooler bypass assembly will be secured to the transmission with the inlet port 10.7 in communication with the ATF outlet port indicated by the arrow $P_o$ and with the outlet port 10.8 in communication with the AFT inlet port $P_i$. When the vehicle is initially started the ATF will be at ambient temperature, for example 55° F. At this temperature, it will flow through port $P_o$ into the inlet port 10.7m and then through the transverse passageway 10.6, and then out of the assembly through outlet port 10.8 and inlet port $P_i$. It will not flow to the cooler, as the temperature is not high enough to cause the thermal actuator to expand and raise the ball 52 against the spring pressure to permit ATF flow past the ball 52 and to the cooler represented graphically at C in FIG. 2. If for any reason the cooler restricts flow, the ballcheck 12 will open up, allowing bypass of the cooler.

Referring now to FIGS. 13A-28, there are depicted several additional aspects of a check valve which can be used in replacement of the ball 12, the spring 14, and the ball check retainer 16 in the cooler bypass housing 10 or used in any other fluid component to uni-directionally control fluid flow through a bore or passageway.

In each of these new aspects, the ball check retainer 16 and the spring 14 will be as substantially shown in FIG. 8. The spring 14 may be provided by itself in the bore in the housing or in a spring cage 70 shown in FIG. 13. Therefore, for clarity, the ball check retainer 16 and the spring 14 will not be shown in all of the FIGS. 13A-23.

In normal operation, when the check valve is not moved to an open position by the actuator and fluid is flowing into the high pressure inlet of the housing, the high fluid pressure overcomes the spring force of the spring 14 and moves the ball or movable element of the valve away from the valve seat in the housing bore. However, substantially immediately after the ball 12 begins to move, high pressure fluid begins to flow around the ball 12 and into the bore of the housing. This results in an immediate substantial equalization of the pressure on both sides of the valve ball 12 which allows the spring 14 to expand and force the ball 12 back in the direction of the valve seat. The result is a modulation or flutter of the ball 12 relative to the valve seat which can create objectionable noise in the operation of the bypass assembly.

Figure 13A:
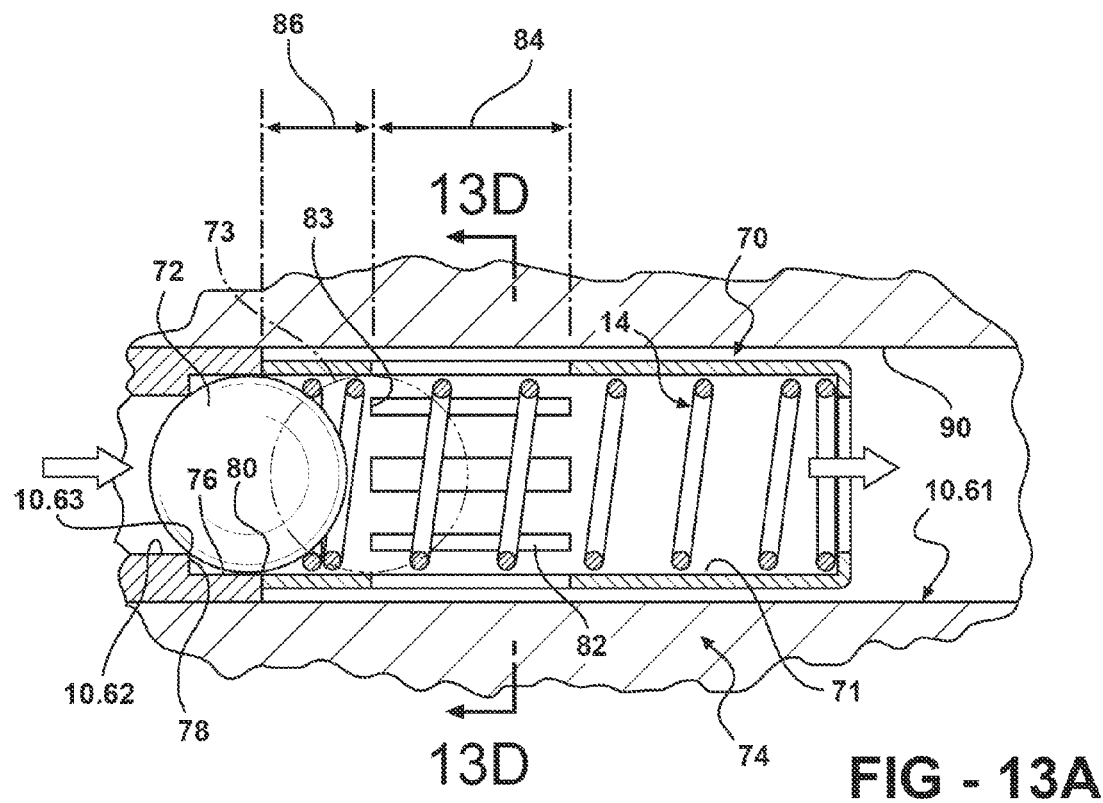
FIG. 13A is a cross sectional view showing another aspect of a check valve usable in a cooler bypass apparatus or in other applications.

As shown in FIG. 13A, the movable element 72 of a valve 74 may be in the form of a ball, or a cylindrical piston with a piston face or a movable body disposed within the housing bore having a conical seat complimentary to the shape of the valve seat 10.63. Therefore, by example only, the movable element or body 72 of the valve 74 will be described hereafter as a ball 72.

The valve 74 includes a second bore 76 of a larger diameter than the bore 10.62 which extends from a shoulder or surface 78 which carries the valve seat 10.63. The second bore 76 transitions through a second shoulder or surface 80 to a third larger bore portion 10.61. The second shoulder 80 acts as a stop for the spring cage 70.

In normal operation, prior to the introduction of pressurized fluid into the assembly, the spring 14 will exert a force against the ball 72 which will hold the ball 72 firmly against the at least the first valve seat 10.63. This blocks the flow of fluid through the bores 10.62, 76 and 10.61.

Figure 13B:
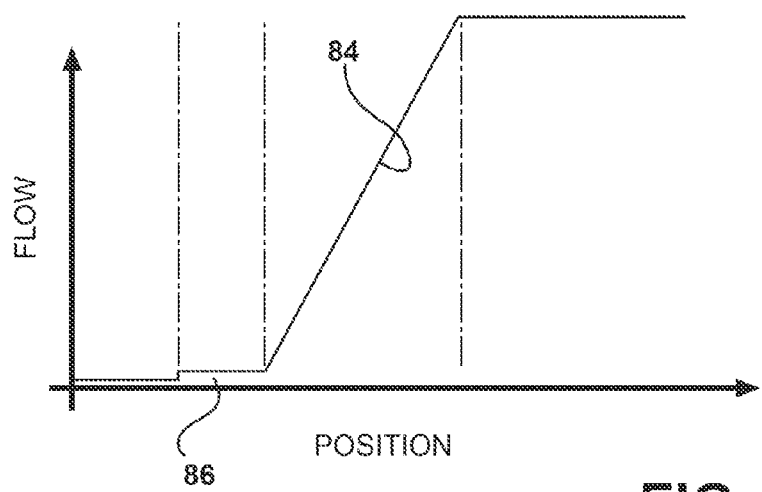
FIG. 13B is a graph depicting fluid flow versus check valve ball position.
Figure 13C:
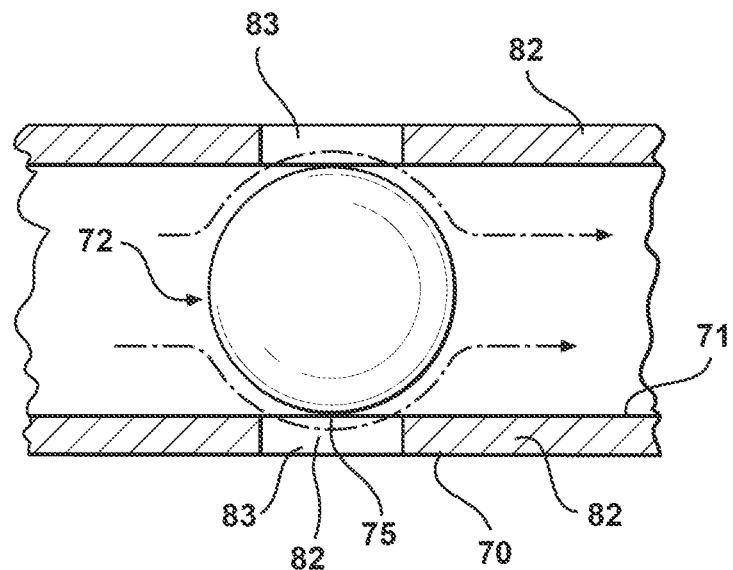
FIG. 13C is an enlarged side cross section view showing the valve body in the modulation zone.
Figure 13D:
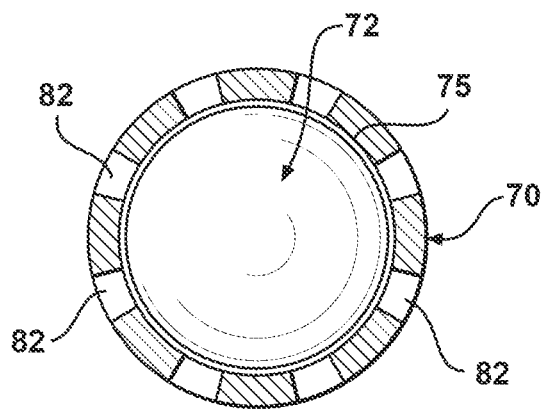
FIG. 13D is lateral cross section view generally taken along line 13D-13D in FIG. 13A.
Figure 14:
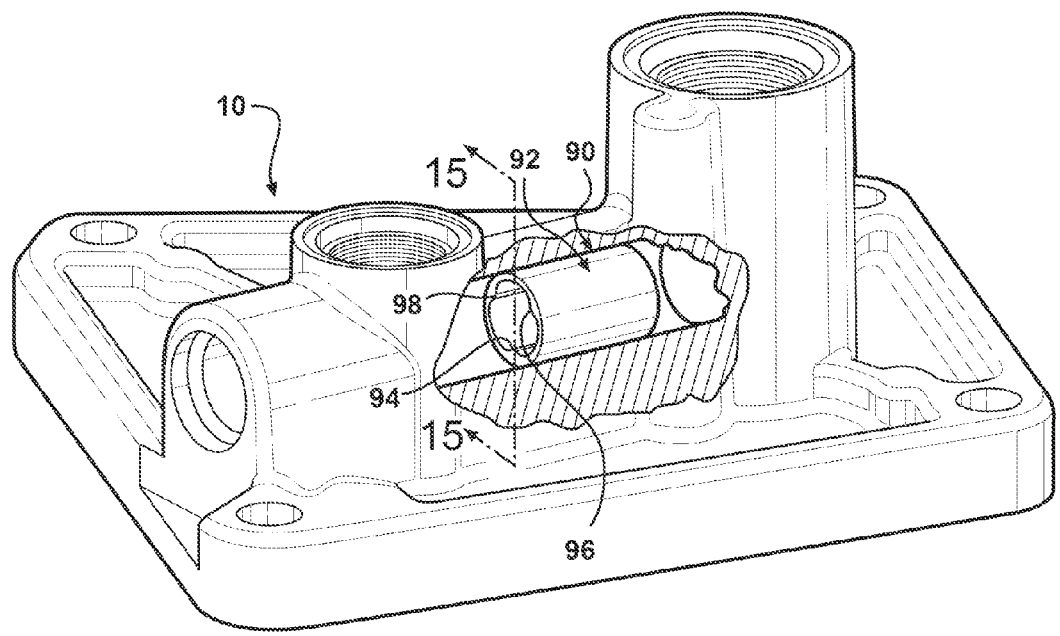
FIG. 14 is a perspective, partially transparent view showing another aspect of a cooler bypass apparatus valve.
Figure 15:
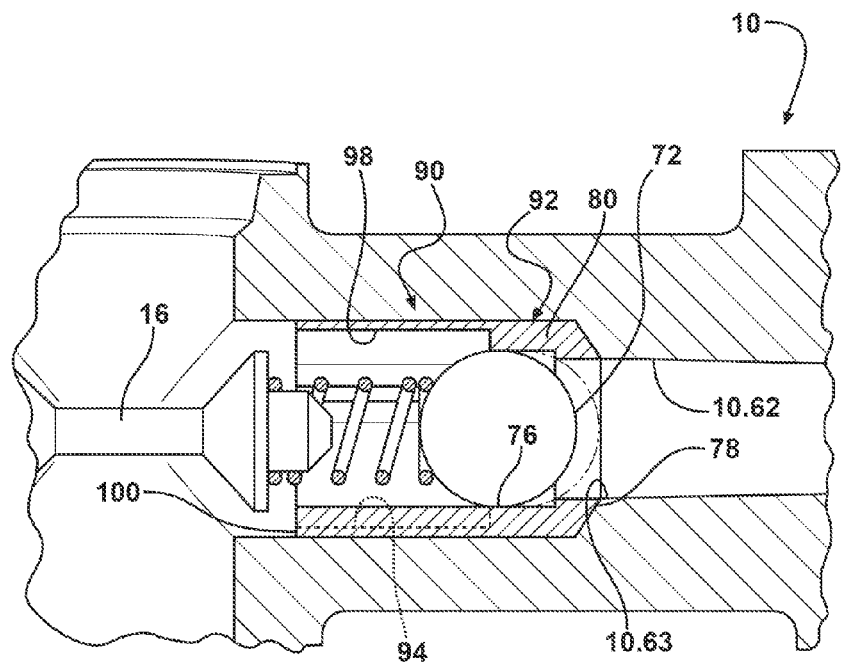
FIG. 15 is a cross sectional view generally taken along lines 15-15 in FIG. 14.

The spring cage 70 includes an oscillation dampening construction which, in this aspect, includes at least one or a plurality of apertures 82 formed through at least an inner surface 71 of the cage 72 and arranged in a circumferential pattern at a position spaced from one end of the spring cage 70 to define a modulation flow zone denoted by reference number 84 in FIGS. 13A and 13B. The apertures 82 may take any form, such as the elongated slots shown by example only in FIGS. 13A and 13D, but which may be open entirely through the wall of the cage 70 or just a groove in the wall of the cage.

When fluid of a sufficiently high pressure is introduced through the inlet port of the housing, the fluid pressure will overcome the force of the spring 14 thereby urging the ball 72 away from the valve seat 10.63. This initial movement of the ball 72 is in a first, controlled leak liftoff zone denoted generally by reference number 86 which extends from the second shoulder 80 to the beginning of the flow apertures 82. In the controlled leak liftoff zone 86, there is little or only a minimal amount of fluid flow past the ball 72 and through the apertures 82. When the circumference or largest diameter portion of the ball 72 reaches the beginning point or edge 83 of the apertures 82, shown in phantom in FIG. 13A as reference number 73, fluid begins to flow around the outer surface 75 of the ball 72 as shown by reference number 83 in FIG. 13C and into and through the apertures 82 in the spring cage 70 back into and through the remainder of the bore 10.61 in the direction of the arrows in FIG. 13A. Point 83 defines the start of the second modulated flow zone 84 in which fluid flows from bore 10.62 past the ball 72 and through bore 10.61.

A portion of the fluid interim the apertures or slots 82 can flow completely through the apertures 82 and over the exterior surface of the spring cage 70, if any such space exists, before re-entering the main bore 10.61 flow.

During such movement of the ball 72, fluid passes through the bore 10.62 and into the bore space between the first valve seat 10.63 and, also into the liftoff zone 86. This creates a volume of pressurized fluid between the ball 72 and the valve seats 10.63 which acts as a damper to modulate any reverse movement of the ball 72 toward the valve seat 10.63. While there may be a few thousandths of inches of axial movement of the ball 72, the cushion of fluid acting on one end of the ball 72 substantially maintains the ball 72 in the modulated flow zone 84 and prevents contact of the ball 72 with the valve seat 10.63 until fluid flow is discontinued.

In another aspect of a valve 90 as shown in FIGS. 14, 15, 16A and 16B, the valve 90 includes an insert or body 92 in the form of a cylindrical body which carries the bore 10.62, the valve seat 10.63, the shoulder 78, the second bore 76, the second shoulder 80 and a third bore 90.

The body 92 may be mounted in the housing 10 by press fit, or by other mounting means. The body 92 receives the spring 14, the spring cage 70, and one end of the ball check 16. In this aspect, one or more longitudinally extending flutes or flow channels, with three flutes 94, 96, and 98, as shown by example only, are formed within the interior of the body 92 and extend substantially from the second shoulder 80 to one end 100 of the body 92. The flutes 94, 96, and 98 are similar in function as the apertures 82 between the exterior of the spring cage 70 and the valve 90 of the bore 10.61 described above and shown in FIG. 13A and define flow paths for pressurized fluid from the first end or bore 10.62 or through the bore 10.61 when the ball 72 has been moved into the modulated flow zone 84 as described above.

Referring now to FIG. 17, there is depicted another aspect of a check valve 140 which may be employed in any check valve application that requires one-way directional flow through a bore or passageway, such as in the bypass cooler application described above and shown in FIGS. 1-12.

The check valve 140 includes a movable member 72, such as a ball 72 described by way of example only, a biasing spring 14 operative to engage and normally bias the movable member or ball 72 into sealed engagement with a valve seat 142 formed in a first end 144 of a spring cage 146 which captures the ball 72 and the spring 14. A second end 148 of the spring cage 146 is turned inward as a flange or stop to retain the spring 14 and the ball 72 within the interior of the spring cage 146.

The spring cage 146 with the integrally mounted ball 72 and spring 14, and integral, one-piece valve seat 142 may be inserted as a cartridge or insert into a fluid bore in an orientation such that the spring 14 normally biases the ball 72 into sealed engagement with the valve seat 142 in an opposite direction from the desired fluid flow through an inner bore 150 formed with the spring cage 146.

Apertures, such elongated slots 82, are formed in a circumferential band in the sidewall of the spring cage 146 spaced from the first end 144. The leading edges 83 of the slots 82 are positioned along the length of the sidewall of the spring cage 146 to define a first substantially no-leak zone 86 and second modulating zone 84 as described above. When fluid pressure acting on the ball 72 to move the ball 72 in a direction overcoming the biasing force exerted by the spring 14, the ball 72 initially moves through the substantial no-flow liftoff zone 86 in which fluid flow through the interior of the spring cage 146 remains substantially blocked. Only when the circumference or largest diameter portion of the ball 72 reaches the leading edge 83 of the slots 82 at the start of the second modulation flow zone 84, does fluid begin to flow past the exterior surface of the ball 72 through a portion of the slots 82 and then through the remaining portion of the bore 150 in the spring cage 146 and then onto the main bore in which the cage 146 is mounted. The fluid flowing through the open first end 144 of the spring cage 146 through the first distance or zone 80 creates a volume of fluid which maintains the ball 72 in the second modulation flow zone 84 and out of contact with the valve seat 142 as long as fluid is flowing, as described above.

Figure 18:
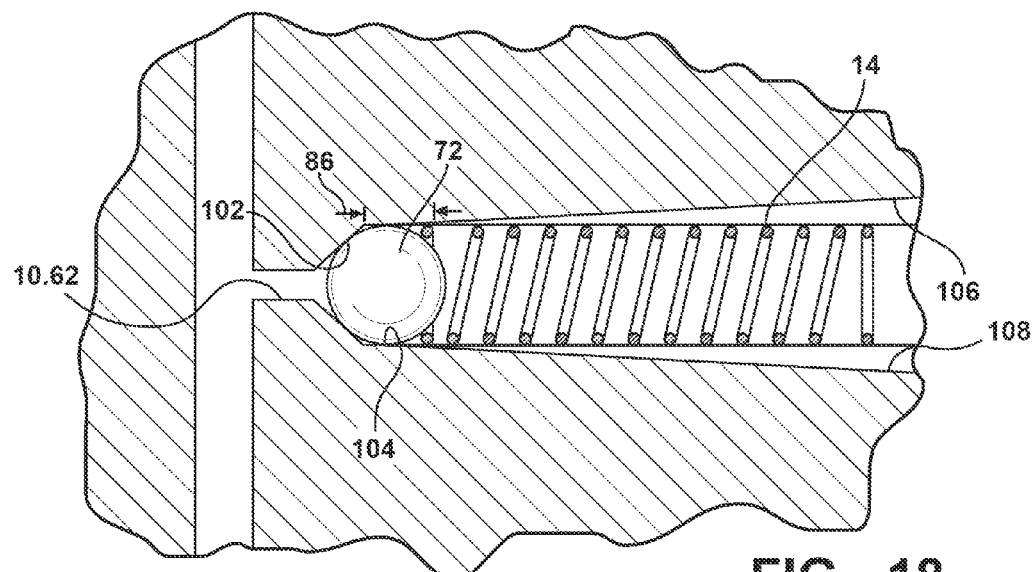
FIG. 18 is a cross sectional view showing another aspect of a check valve.

In the following aspects shown in FIGS. 18-23, the oscillation dampening construction is disposed directly within a bore or fluid passage in valve housing and moves relative to a valve seat also integrally formed in the valve housing. It will be understood that the oscillation dampening construction shown in FIGS. 13-17, which utilize an insert or body inserted into a fluid passageway in valve housing, can also be employed directly within the fluid passageway of valve housing without the insert. Likewise, the following aspects of the oscillation dampening construction which are described and illustrated, by example only, as being employed directly within the fluid passage of a valve housing, could also be employed in an insert or body inserted into a fluid passageway in a valve housing In another aspect shown in FIG. 18, a conical shaped valve seat 102 is formed between one end of the bore 10.62 and a second larger diameter bore 104. The bore 104 continues at a constant diameter substantially along the length of the valve. Flutes 106 and 108, with two flutes being shown by example only in the cross sectional view depicted in FIG. 18, are formed in a cylindrical body similar to body 92 or directly in the housing. The flutes 106 and 108 open to the bore 104. The flutes 106 and 108 may have, as shown in FIG. 18, a tapered draft angle configuration having an expanding diameter from the beginning of the modulation zone 84 to the opposite end of the bore 104.

The separate flutes 106 and 108 shown in FIG. 18 need not be separately formed in the body 92 or the housing bore as such flutes or draft angles may be a normal part of the casting process and can be employed to form the flow paths around the movable element of the valve. A machined bore with sufficient diameter starting at the beginning of the modulation flow or zone 84, would accomplish the same purpose.

Figure 19:
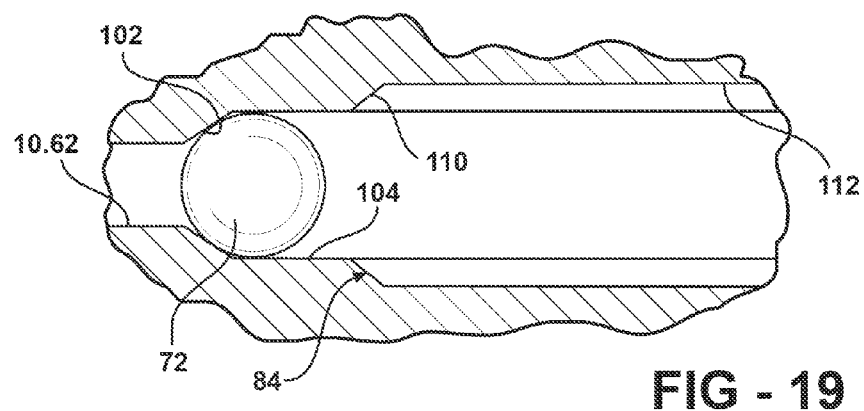
FIG. 19 is a cross sectional view showing yet another aspect of a check valve.
Figure 20:
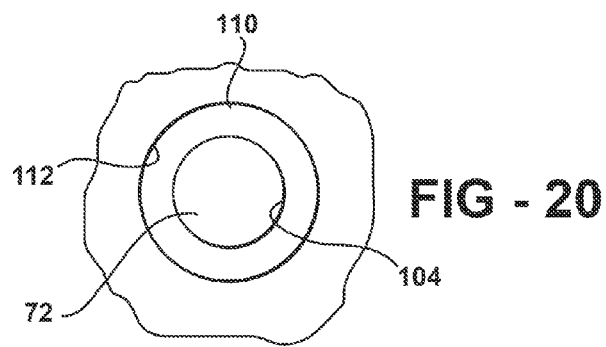
FIG. 20 is an end view of the check valve shown in FIG. 19.

A modification of this design is shown in FIGS. 19 and 20 in which the beginning of the modulation zone 84 is defined by a shoulder 110 which may be a conical shoulder which forms a tapered transition between the second bore 104 and a larger diameter bore 112 which extends to the opposite end of the valve.

Figure 21:
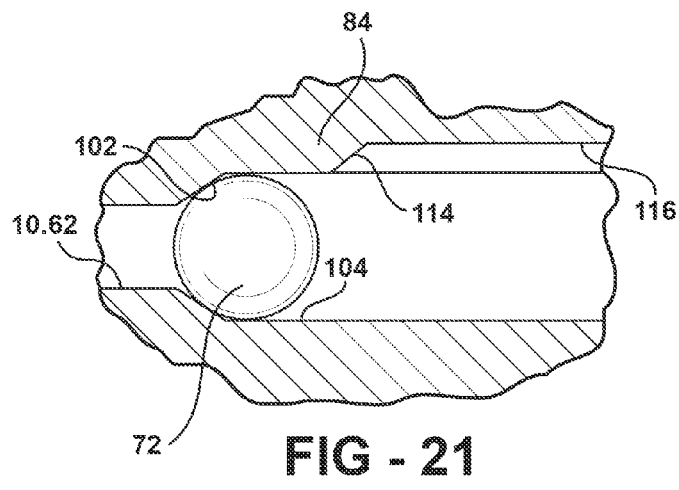
FIG. 21 is a cross sectional view of yet another aspect of a check valve.
Figure 22:
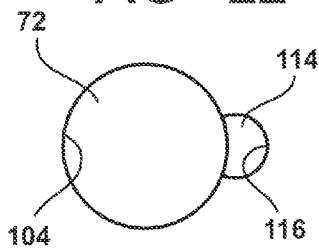
FIG. 22 is an end view of the check valve and valve housing shown in FIG. 21.

In another aspect shown in FIGS. 21 and 22, the flutes 106 and 108 are replaced by one or more secondary bores 116 which extend along the length of the constant diameter second bore 104 from a transition surface 114 which is located at the initial modulation point of the modulation zone 84. One or more secondary bores 116 also will form flow paths through the modulation zone 84 and the main second bore 104.

Figure 23:
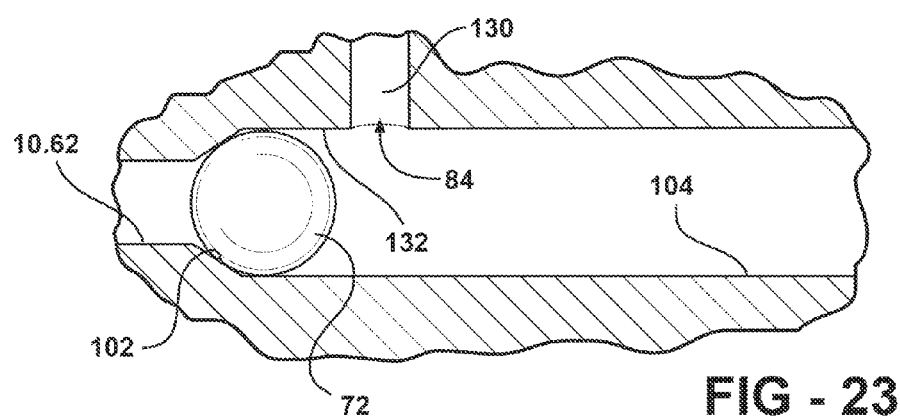
FIG. 23 is a cross sectional view of another aspect of a check valve.

As depicted in FIG. 23, a no-flow zone 132 and the beginning of the modulation zone 84 may be formed simply by cross drilling a transversely extending bore 130 into fluid communication with the through second bore 104 to create the no-flow zone 132 and the modulation zone 84 in the bore.

Figure 24:
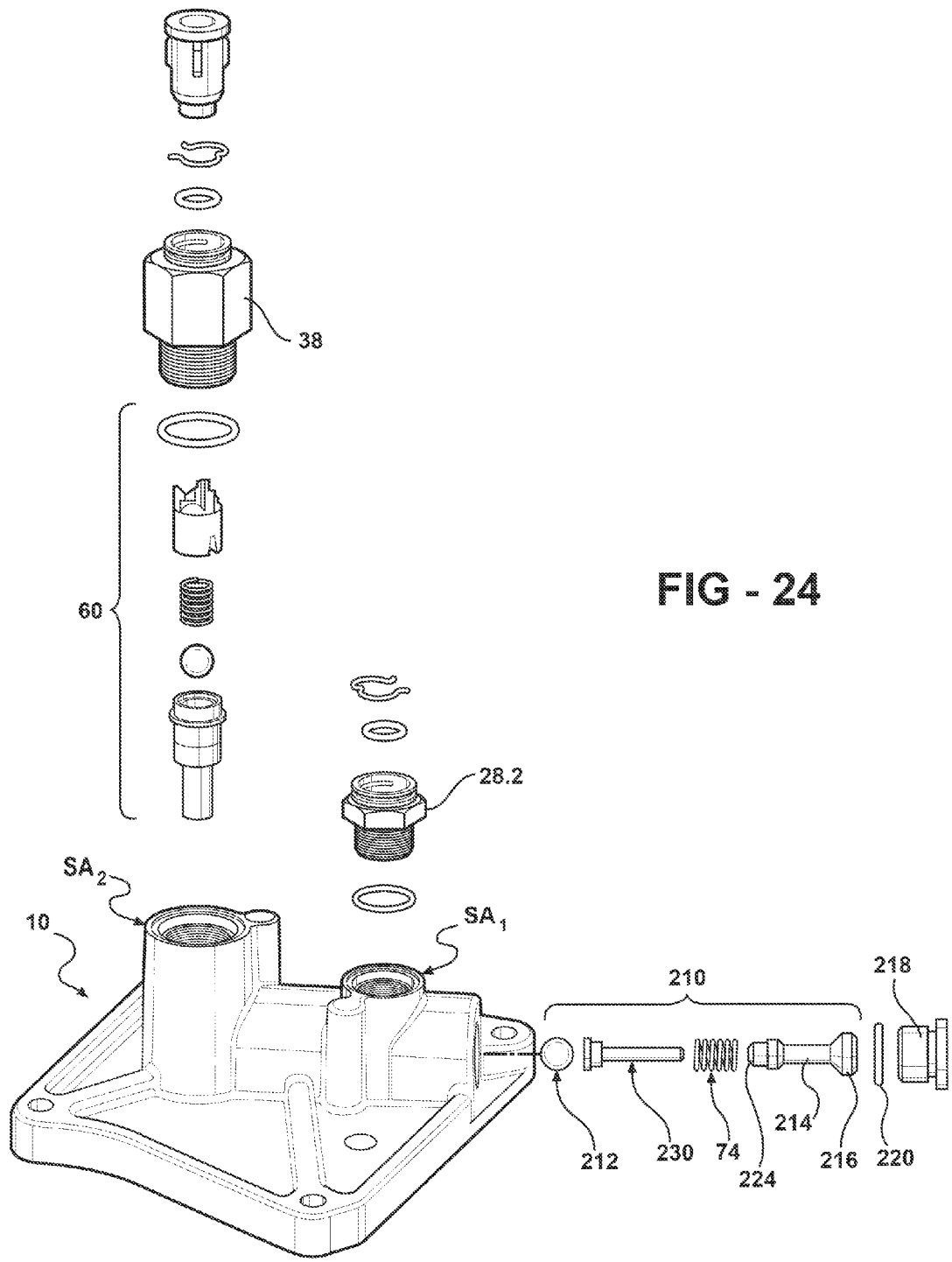
FIG. 24 is an exploded, perspective view of another aspect of a check valve.
Figure 25:
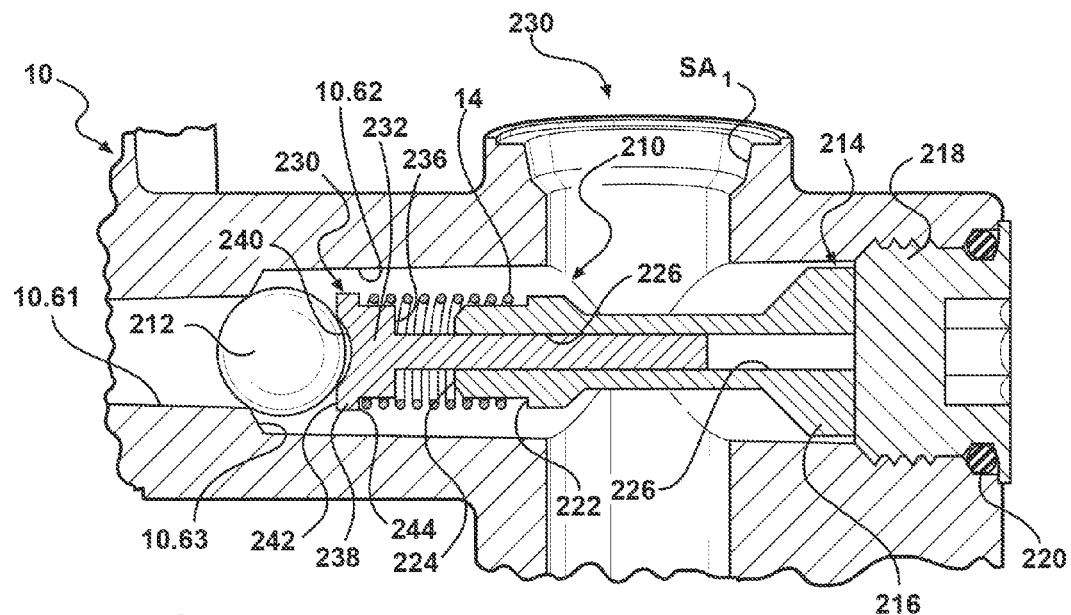
FIG. 25 is a longitudinal cross sectional view of the assembled check valve and cooler bypass assembly shown in FIG. 24.

Referring now to FIGS. 24 and 25, there is depicted another aspect of a check valve employable in uni-directional flow applications. The check valve 210 will be described by way of example only as usable in the cooler bypass assembly 10 described above and shown in FIG. 1.

In the aspect, the check valve 210 is mounted in the transverse bore fluidically extending between the first and second fluid flow passageways $SA_1$ and $SA_2$ as described above. The transverse bore has a first smaller diameter portion 10.61 and a second larger diameter portion 10.62. A conical valve seat 10.63 is formed at the intersection of the first and second bore portions 10.61 and 10.62.

The check valve 210 includes a movable member 212 which will be described hereafter as being in the form of a spherical ball. It will be understood that other shapes may also be employed as the movable member as described in previous aspects of the check valve.

The spring 14 or biasing member is mounted on a spring retainer 214. The spring retainer 214 is a one-piece member having an enlarged first end 216 which seats against an end surface of a plug 218. A seal member 220, such as an O-ring, sealingly couples the plug 218 into and closing the transverse bore section 10.62 at a position beyond the transversely extending fluid flow passageway $SA_1$.

The spring retainer 214 has a shoulder 222 spaced from an opposite second end 224. The shoulder 222 serves as a seat for one end of the spring 14. A bore 226 extends through at least a portion of the spring retainer 214 from the second end 224.

The check valve 210 includes means for dampening the movement of the movable valve member or ball 212 and to prevent oscillation of the ball 212 in all directions within the bore section 10.62. The dampening means includes a slidable member 230 having an elongated rod or stem 232 slidably disposed within the bore 226 in the spring retainer 214. A piston 234 extends from one end of stem 232 and is disposed externally of the second end 224 of the spring retainer 214. The piston 234 has a first diameter portion 236 and a second larger diameter portion 238, by example only. A seat or spherical recess 240 is formed in an end face 242 in the enlarged portion 238 of the piston 234. The recess 240 is sized to snugly receive and capture the movable valve member or ball 212 to prevent oscillation of the ball in all directions within the bore section 10.62.

A shoulder 244 is formed as a second spring seat between the first diameter portion 236 and the enlarged diameter portion 238 of the piston 234. The spring 14 is thus captured between the seat 222 on the spring retainer 214 and the seat 244 on the piston 234.

An end portion of the spring retainer 214 extending from the second end 224 to the seat 222 has an outer diameter to concentrically receive one end of the spring 14 to center and retain the spring 14 in position.

In use, when the check valve 210 is in the normal closed position preventing fluid flow from the first bore section 10.61 through the second bore section 10.62 and into the first fluid flow passageway $SA_1$ of the body 10, the spring 14 will extend the piston rod 232 relative to the spring retainer 214 to bring the recess 240 in the piston head 234 against the movable valve member or ball 212 thereby securely sealing the ball 212 against the valve seat 10.63.

When the pressure of the pressurized fluid flowing through the first bore section 10.61 exceeds the force of the spring 14, the pressurized fluid will force the movable valve member or ball 212 away from the valve seat 10.63. The movable valve member or ball 212 moves to the right, in the cross sectional view of FIG. 27 thereby moving the piston 234 and the piston rod 232 into the bore 226 in the spring retainer 214 and compressing the spring 14. Pressurized fluid then flows past the ball 212 over the valve seat 10.63 and into the bore section 10.62 and from the bore section 10.62 into the first fluid passageway $SA_1$.

Since pressurized fluid is now on both sides of the piston head 234 and ball 212, any oscillation of the ball 212 due to pressure equalization which would tend to move the ball back towards the valve seat 10.63 resulting in objectionable flutter and noise is prevented by the increased effective mass of the joined movable member 212 and the piston 230. The ball 212 is captured in the recess 240 in the piston head 234 to make the ball 212 and the piston 230 act as a single co-joined body. The piston 230 effectively increases the mass of the ball 212 which dampens any oscillations of the ball 212 in longitudinal and transverse directions within the bore section 10.62.

In addition, the area behind the piston head 234 within and around the spring 14 will eventually be filled with pressurized fluid since the fluid is flowing from the bore section 10.61 around the ball 212 and the exterior of the piston head 234. The pressurized fluid which is located behind the piston head 234 in the area of the spring 14 also acts on the joined piston head 234 and ball 212 as an additional hydraulic dampener to prevent reverse oscillation of the ball 212 back toward the valve seat 10.63.

Figure 26:
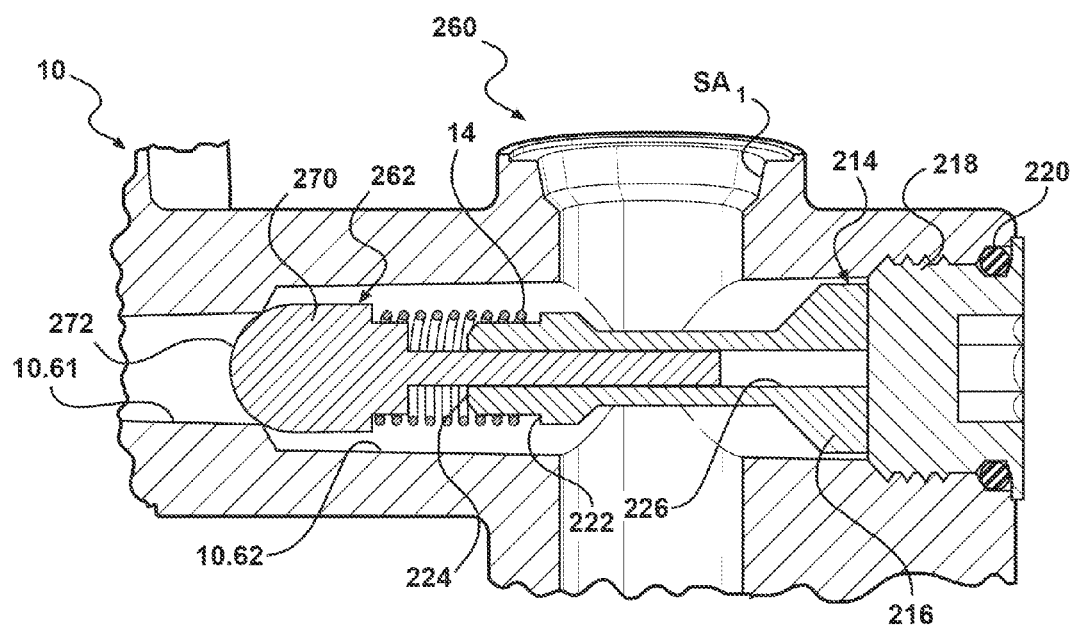
FIG. 26 is a longitudinal cross sectional view of another aspect of the check valve shown in FIGS. 26 and 27.

A modification to the check valve 210 is shown in FIG. 26 as part of a check valve 260. Like elements in the check valves 210 and 260 are depicted with the same reference number and will not be described in detail except to explain the interaction of such like members or components and any modified or additional components.

Thus, the check valve 260 which is depicted as being mounted in the transverse bore sections 10.61 and 10.63 of the cooler bypass assembly housing 10, includes the spring 14 and the spring retainer 214. The bore 226 is formed in the spring retainer 214 extending from the first end 224. The shoulder 222 is formed at a position spaced from the first end 224 of the spring retainer 214 to serve as a seat for the spring 14. In this aspect, the check valve 260 includes an integral or unitary movable member 262 which serves the dual functions of the movable member or ball 212 and the piston 230 in the check valve 210 described above and shown in FIGS. 26 and 27.

The movable member 262 includes an elongated stem or rod 264 which slidably fits within the bore 226 of the spring retainer 214. A first enlarged diameter portion 266 extends from one end of the stem or piston rod 264 and has an outer diameter sized to fit within the inner diameter of the spring 14 to center the spring 14 between the first seat 222 formed on the spring retainer 214 and a second seat 268 formed by a shoulder on the movable member 262 between the outer diameter of the first enlarged portion 266 and an outer diameter of a dumbbell or hemispherical shaped head 270. The head 270 has a spherical end portion 272 which sealingly engages the valve seat 10.63 to block fluid flow through the bore sections 10.61 and 10.62 in a normally closed position of the check valve 260.

It will be understood that the stem 264, while unitarily joined to the head 270 may be a separate component from the head 270 and fixed thereto in a slip or friction fit as well as being joined to the head 275 by welding, or other joining means. The stem 264 and head 270 may also be unitarily cast or molded as part of a unitary movable member 262.

The movable member 262 provides the same function as the ball 212 and the piston 230 in the check valve 210 in that it dampens movement of the head 270 to prevent oscillation of the head 270 in both directions within the bore 10.4 and 10.62 as pressurized fluid flows through the bore sections 10.61 and 10.62 into the first fluid flow passage $SA_1$.

It will be further understood that the oscillation dampening constructions shown in FIGS. 24-26 are illustrated by example only as being disposed within fluid passageway of a large valve body; but could also be disposed within an insert housing disposed within a bore in a fluid passageway in the larger valve housing.

Figure 27:
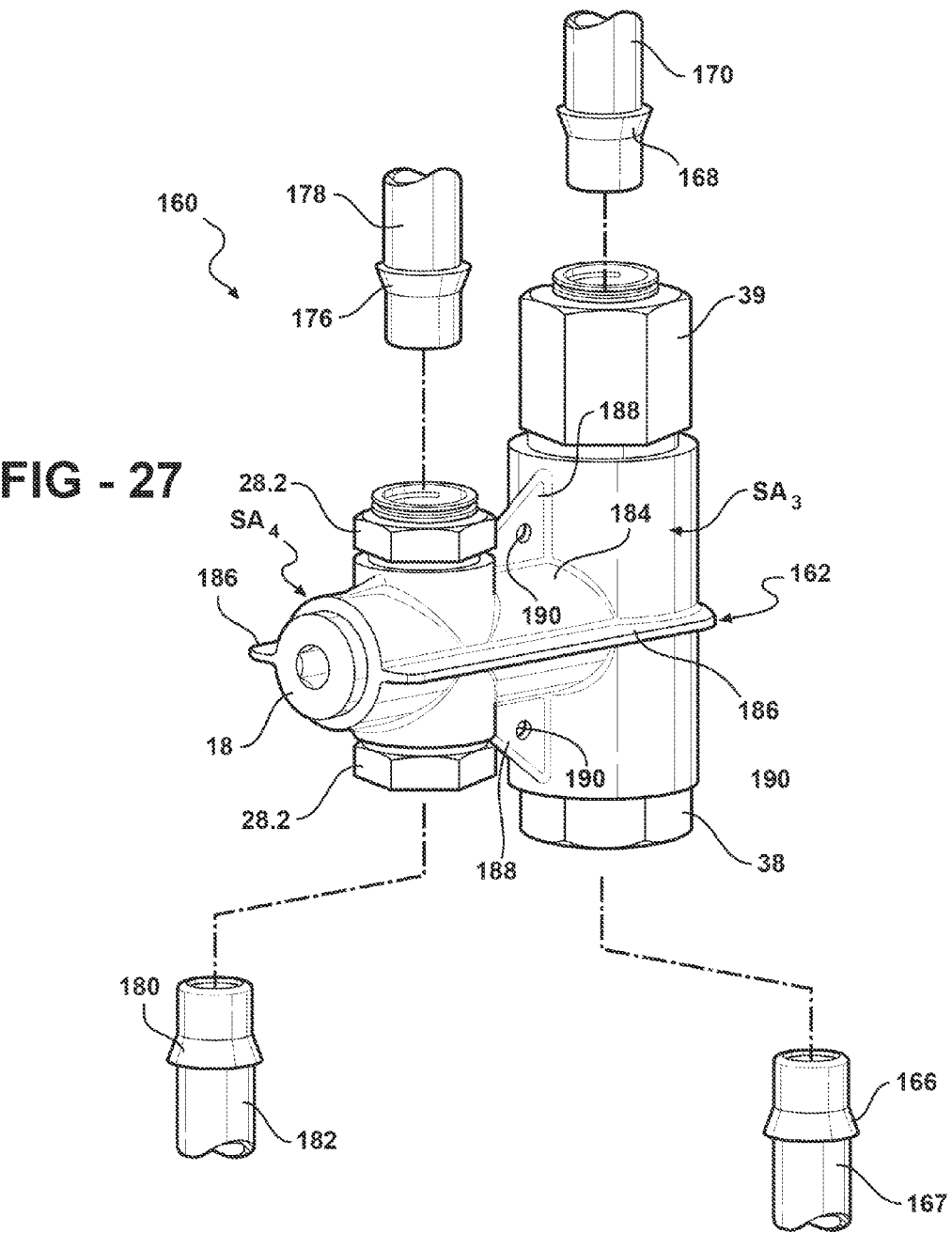
FIG. 27 is an exploded, perspective view of another aspect of a check valve used in a cooler bypass application.

Referring now to FIG. 27, there is depicted another aspect of a cooler bypass assembly 160. The assembly 160 includes a body 162 which may be formed of a one-piece casting, a machined body, or multiple pieces joined together by welds, fasteners, or combinations thereof.

The body 162 has a first fluid flow passage $SA_3$ with a through bore extending between a first coupler 38 and a second coupler 39. The thermal valve assembly described above may be mounted in the bore in the first fluid flow passage $SA_3$.

The couplers 38 and 39 are quick connectors where the coupler 38 is adapted for receiving an enlargement 166 on a profiled end surface of a pipe 167 to connect the inlet of the first fluid flow passage $SA_3$ which can be coupled to the outlet or discharge of a fluid flow fitting on the machinery carrying the coolant fluid.

The coupler 39 similarly receives an enlargement 168 on a profiled end surface of a pipe or conduit 170 in a snap-in connection to couple the pipe 170 to the outlet end of the first flow passageway $SA_3$ in the body 162.

A second fluid flow passageway in the form of a bore mounted in the body 162 is denoted by $SA_4$. The second fluid flow passageway also includes couplers 28.2 in the form of quick connectors which are mounted in or otherwise connected to the couplers 28.2 or coupled directly to the body 162. The coupler 28.2 is adapted for receiving an enlargement 176 on a profiled end surface of a pipe or conduit 178 which receives fluid, such as from an outlet of a cooling device or cooler. The other coupler 28.2 receives a similar enlargement 180 on a profiled end surface on a pipe or conduit 182 connected to a coupling on a fluid carrying component. The second fluid flow passageway $SA_4$, is adapted, for example, for receiving coolant flow from the cooler, not shown, through the pipe 178 and passing the fluid through the pipe 182 back to the machinery which utilizes the coolant fluid.

The body 162 also includes a transverse or bypass bore housed in a body section 184. The body section 184 may house a check valve, as described above, to control one way directional flow of fluid between portions of the first and second fluid passageways, $SA_3$ and $SA_4$, dependent upon the position of the thermal valve mounted in the first fluid flow passageway $SA_3$, as described previously.

The pipes 167, 170, 178 and 182, may be constructed of any fluid carrying material suitable for a particular application. The pipes 167, 170, 178 and 182 may be rigid or flexible. Thus, the pipes 167, 170, 178, and 182 themselves may be used to mount the body 162 between the cooler, not shown, and the machinery which carries the coolant fluid, also not shown.

In addition, the body 162 includes a first pair of flanges 186 as well as transverse flanges or ribs 188. Bores 190 may be formed in any of the flanges or ribs to enable mechanical fasteners to be employed to fixedly mount the body 162 to any surface, including surfaces or components adjacent to the machinery carrying the coolant fluid, rather than or in addition to a connection directly on the machinery carrying the coolant fluid, or not directly to the fluid flow ports as described in the first aspect of the cooler bypass assembly.

Figure 28:
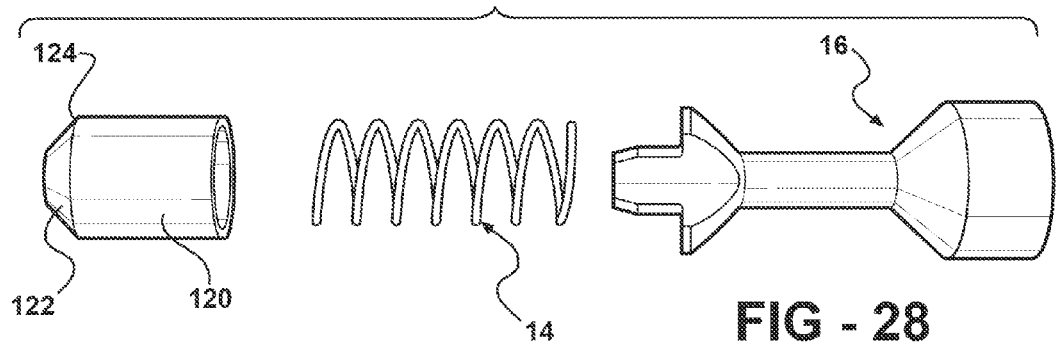
FIG. 28 is an exploded side view of another aspect of a check valve, valve spring and valve check.

Referring briefly to FIG. 28, there is depicted an example of the ball check 16 and the spring 14. The movable element of the valve, in this aspect, is depicted as a hollow, cylindrical body 120 having a conical seat surface 122 at one end which is configured to mate with a complimentary conical seat, such as conical valve seat 102 described above. The edge 124 of the body 120 at one end of the conical seat 122 defines the outer diameter of the cylindrical body 120 around which fluid begins to flow through the flutes 106, 108 or apertures 82, as described above, when the surface 124 reaches the beginning of the modulation zone 84.

What is claimed is:

1. A fluid flow bypass apparatus comprising:
a housing adapted to be coupled to a structure having a fluid requiring cooling, the housing having inlet and outlet ports, the housing further having first and second passageways in communication with the inlet and outlet ports and a transverse passageway extending between the first and second passageways the first passageway extending from one inlet port to one outlet port and the second passageway extending towards another outlet port from another inlet port;
a check valve disposed in the transverse passageway to insure one way flow of fluid through the transverse passageway between the first and second passageways;
a valve disposed in one of the first and second passageways;
a thermal actuator engageable with the valve to move the valve to a position blocking fluid flow through the one of the first and second passageways until sensing a predetermined fluid temperature;
a valve seat disposed in a bore in the transverse passageway;
a movable member disposed in the bore;
a biasing member engaged with the movable member and acting to normally bias the movable member into engagement with the valve seat;
the bore having a diameter substantially the same as an outer diameter of the movable body extending from the valve seat for a first distance defining a first zone for movement of the movable member away from the valve seat without substantial fluid flow through the first zone past the movable member;
a second zone extending from the end of the first zone for a second distance defining a modulated flow zone where the movable member is biased away from contact with the valve seat by a volume of fluid flowing through the first zone into the second zone past the movable member, the second zone having an increasing cross-section through the second distance of the second zone.

2. The apparatus of claim 1 comprising:
the bore having a diameter substantially the same as an outer diameter of the movable member extending from the valve seat for the first distance extending from the valve seat at least substantially to an opposite outermost portion of the movable member when the movable member is engaged with the valve seat defining the first zone.

3. The apparatus of claim 2 wherein:
at least a portion of the second zone has a larger diameter than a diameter of the first zone.

4. The apparatus of claim 2 wherein:
the second zone includes at least one fluid flow passageway portion having a larger diameter than a portion of the bore extending through the second zone.

5. The apparatus of claim 2 further comprising:
the second zone defined by flow path extending from an end of the first zone to an outlet.

6. The apparatus of claim 2 wherein:
the first zone has a substantially constant diameter through at least the first distance.

7. The of claim 2 further comprising:
an insert adapted to be mounted in the fluid flow bore, the insert carrying the movable member, the biasing member and the first and second zones.

8. The check valve of claim 7 wherein:
the valve seat integrally carried in the insert.

9. The apparatus of claim 2 further comprising:
a rod movably disposed within the bore for axial movement, the rod coupled to the movable member.

10. The apparatus assembly of claim 9 further comprising:
an enlarged head coupled to the rod;
the biasing member acting on the head to urge the head toward the movable member to move the movable member into engagement with the valve seat in a normally closed fluid blocking position, the movable member and the head formed as separate members.

11. The apparatus of claim 10 further comprising:
the head having a surface configured to capture a portion of the movable member to cause axial movement of the movable member, the movable member and the head formed as a unitary mass within the bore.

12. The apparatus assembly of claim 9 wherein the movable member further comprises:
a head joined to the rod, the head having a surface engageable with the valve seat.

* * * * *